United States Patent [19]
Moser et al.

[11] Patent Number: 4,900,812
[45] Date of Patent: Feb. 13, 1990

[54] SULFO GROUP-CONTAINING METAL PHLHALOCYANINE AZO COMPOUND HAVING A 6-HYDROXYPYRID-2-ONE COUPLING COMPONENT RADICALS HAVING A FIBER-REACTIVE GROUP

[75] Inventors: Helmut A. Moser, Oberwil, Switzerland; Roland Wald, Huningue, France

[73] Assignee: Sandoz Ltd., Basel, Switzerland

[21] Appl. No.: 149,813

[22] Filed: Jan. 29, 1988

[30] Foreign Application Priority Data

Jan. 31, 1987 [DE] Fed. Rep. of Germany ....... 3702946

[51] Int. Cl.⁴ .................... C09B 62/036; C09B 62/10; C09B 62/26; C09B 62/517
[52] U.S. Cl. .................. 534/627; 534/573; 534/605; 534/617; 534/622; 534/624; 534/628; 534/629; 534/887
[58] Field of Search ............... 534/624, 622, 628, 627, 534/629, 605

[56] References Cited

U.S. PATENT DOCUMENTS 3,752,801  8/1973  Hoelzle et al. ................. 534/628 X

FOREIGN PATENT DOCUMENTS 1296857  11/1972  United Kingdom ............... 534/628
1318561   5/1973  United Kingdom ............... 534/628
1372527  10/1974  United Kingdom ............... 534/628
2021133  11/1979  United Kingdom ............... 534/628

Primary Examiner—Floyd D. Higel
Attorney, Agent, or Firm—Gerald D. Sharkin; Richard E. Vila; Melvyn M. Kassenoff

[57] ABSTRACT

Compounds of the formula

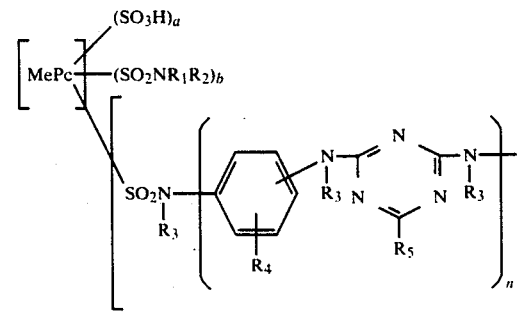

-continued

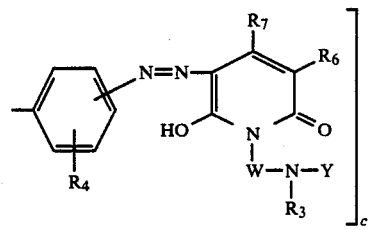

and water-soluble salts thereof each cation of which is independently a non-chromophoric cation, wherein
  Me is cobalt, copper or nickel,
  Pc is the phthalocyanine radical,
  each $R_1$ and $R_2$ is independently hydrogen or $C_{1-6}$ alkyl,
  each $R_4$ is independently hydrogen, halo, hydroxy, $C_{1-4}$ alkoxy, $C_{1-4}$ alkyl, carboxy or sulfo,
  each $R_6$ is hydrogen, cyano, carbamoyl or

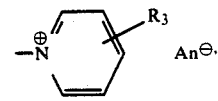

wherein
  An $\ominus$ is a non-chromophoric anion,
  each $R_7$ is hydrogen, $C_{1-4}$ alkyl, $C_{5-6}$ cycloalkyl, phenyl, benzyl, phenylethyl or carboxy,
  each W is linear or branched $C_{2-6}$ alkylene; linear or branched $C_{3-6}$ alkylene monosubstituted by hydroxy; linear or branched $C_{2-6}$ alkylene interrupted by

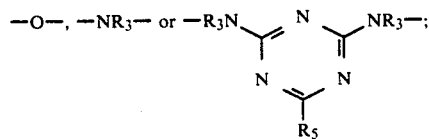

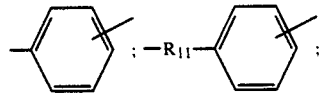

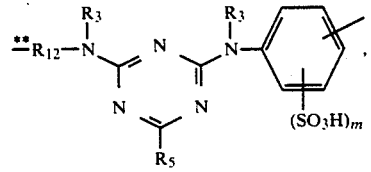

wherein
  $R_{11}$ is linear or branched $C_{1-4}$ alkylene,
  m is 0 or 1, and
  the ** indicates the bond attached to the nitrogen atom of the pyridone ring, or (Abstract continued on next page.)

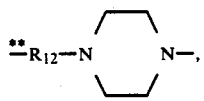

wherein the
** is as set forth above, each Y is a fiber-reactive group,
a is 1, 2 or 3,
b is 0, 1 or 2,
c is 1 or 2, with the provisos that a+b+c does not exceed 4 and that each of the four units of the phthalocyanine nucleus contains a maximum of one substituent selected from those to which a, b and c relate, and
n is 0 or 1, wherein
each $R_3$ is independently hydrogen, $C_{1-4}$ alkyl or $C_{2-4}$ hydroxyalkyl,
each $R_5$ is independently halo, amino or an aliphatic, cycloaliphatic, aromatic or heterocyclic amino group, and
each $R_{12}$ is independently linear or branched $C_{2-4}$-alkylene, and mixtures of such compounds and salts, useful for dyeing and printing hydroxy group- or nitrogen- containing organic substrates, for example leather and fiber materials containing or consisting of natural or synthetic polyamides or of natural or regenerated cellulose, preferably textile material containing or consisting of cotton.

21 Claims, No Drawings

SULFO GROUP-CONTAINING METAL PHLHALOCYANINE AZO COMPOUND HAVING A 6-HYDROXYPYRID-2-ONE COUPLING COMPONENT RADICALS HAVING A FIBER-REACTIVE GROUP

This invention relates to fibre-reactive phthalocyanine azo compounds and a process for their preparation. These compounds are suitable for use as fibre-reactive dyestuffs in conventional dyeing and printing processes.

More particularly, this invention provides compounds, which in one of the possible tautomeric forms, correspond to formula I

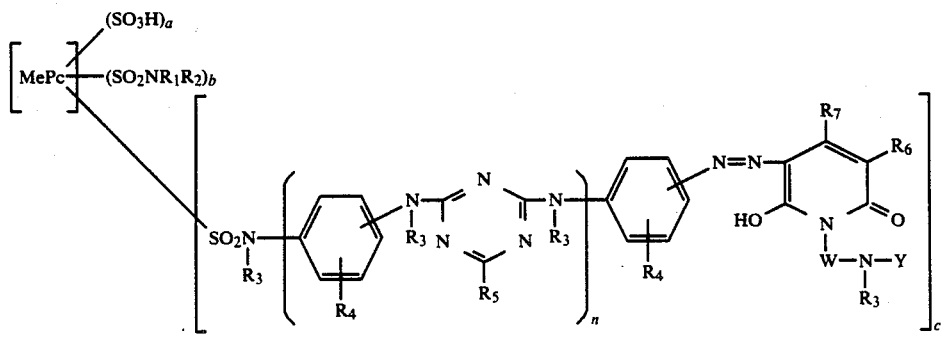

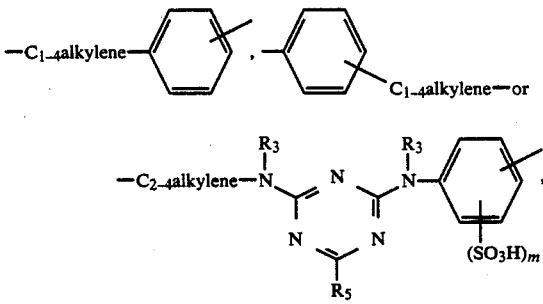

in free acid or salt form, in which
Pc is the phthalocyanine radical,
Me is cobalt, copper or nickel,
each $R_1$ and $R_2$ is independently hydrogen or $C_{1-6}$alkyl,
each $R_3$ is independently hydrogen, $C_{1-4}$alkyl or $C_{2-4}$hydroxyalkyl,
each $R_4$ is independently hydrogen, halogen, hydroxy, $C_{1-4}$alkoxy, $C_{1-4}$alkyl, —COOH or —$SO_3H$,
each $R_5$ is independently halogen, —$NH_2$ or an aliphatic, cycloaliphatic, aromatic or heterocyclic amino group,
n is 0 or 1,
$R_6$ is hydrogen, —CN, —$CONH_2$ or

$R_7$ is hydrogen, $C_{1-4}$alkyl, $C_{5-6}$cycloalkyl, phenyl, benzyl, phenylethyl or —COOH,
$An^\ominus$ is a non-chromophoric anion,
W is —$C_{2-6}$alkylene-; monohydroxy-substituted—$C_{3-6}$alkylene-; a —$C_{2-6}$alkylene-chain which is interrupted by —O—, —$NR_3$ —

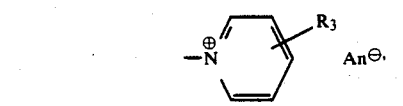

or

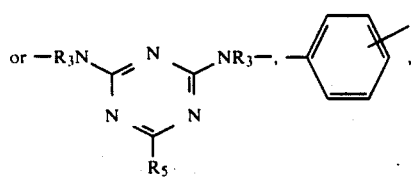

in which
latter group —$C_{2-4}$alkylene- is bound to the nitrogen of the pyridone ring, or
W together with —$NR_3$—Y to which it is attached forms —$C_{2-4}$alkylene $$-N\underset{\diagdown\_\_\_\diagup}{\overset{\diagup\overline{\phantom{xx}}\diagdown}{\phantom{x}}}N-Y,$$

m is 0 or 1,
Y is a fibre-reactive group,
a is 1, 2 or 3,
b is 0, 1 or 2, and
c is 1 or 2, with the proviso that a+b+c do not exceed 4,
and mixtures of compounds of formula I.

In the specification, any alkyl or alkylene group present is linear or branched, unless indicated otherwise. In any hydroxy-substituted alkyl or alkylene group which is attached to nitrogen, the hydroxy group is preferably bound to a carbon atom not directly attached to the nitrogen atom.

In a compound of formula I, Me is preferably copper or nickel, especially nickel.

Each of the four units of the phthalocyanine nucleus contains a maximum of one substituent selected from those to which a, b and c relate.

An alkyl as $R_1$ and $R_2$ is preferably $C_{1-4}$alkyl, more preferably $C_{1-2}$alkyl.

Each $R_1$ and $R_2$ is preferably $R_{1a}$ and $R_{2a}$, where each $R_{1a}$ and $R_{2a}$ is independently hydrogen or $C_{1-2}$alkyl; most preferably, each $R_1$ and $R_2$ is hydrogen.

Any alkyl as $R_3$ is preferably $C_{1-2}$alkyl. Any hydroxyalkyl as $R_3$ is preferably 2-hydroxyethyl.

Each $R_3$ is preferably $R_{3a}$, where each $R_{3a}$ is independently hydrogen, methyl, ethyl or 2-hydroxyethyl.

More preferably, each $R_3$ is $R_{3b}$, where each $R_{3b}$ is independently hydrogen or methyl.

Any halogen as $R_4$ is preferably chlorine or bromine, especially chlorine. Any alkyl or alkoxy as $R_4$ preferably contains 1 or 2 carbon atoms.

Each $R_4$ is preferably $R_{4a}$, where each $R_{4a}$ is independently hydrogen, chlorine, $C_{1-2}$alkyl, $C_{1-2}$alkoxy, —COOH or —SO$_3$H. More preferably, each $R_4$ is $R_{4b}$, where each $R_{4b}$ is independently hydrogen, methyl or —SO$_3$H. Most preferably, each $R_4$ is $R_{4c}$, where each $R_{4c}$ is independently hydrogen or —SO$_3$H.

Any halogen as $R_5$ is preferably fluorine, chlorine or bromine, more preferably it is fluorine or chlorine, and most preferably it is chlorine.

Any aliphatic, cycloaliphatic, aromatic or heterocyclic amino group as $R_5$ preferably contains one or two groups selected from $C_{1-4}$alkyl, $C_{5-6}$cycloalkyl and phenyl, which groups are unsubstituted or substituted by up to three substituents conventional in the field of reactive dyes, or it forms a saturated or partially unsaturated 5- or 6-membered heterocyclic ring which may contain up to two further hetero atoms, such as N, O or S, and which may be substituted. In any disubstituted amino group, the two groups may be the same or different.

In any amino group as $R_5$ containing a substituted alkyl group, this alkyl group is preferably $C_{1-4}$alkyl which is more preferably substituted by one or two substituents selected from hydroxy, $C_{1-4}$alkoxy, —COOH, —SO$_3$H, unsubstituted phenyl, phenyl substituted by up to three substituents selected from halogen, $C_{1-4}$alkyl, $C_{1-4}$alkoxy, —COOH and —SO$_3$H, amino, —NHC$_{1-4}$alkyl and —N(C$_{1-4}$alkyl)$_2$.

In any amino group as $R_5$ containing a substituted phenyl group, this phenyl group is preferably substituted by 1 to 3 substituents selected from halogen, more preferably chlorine, $C_{1-4}$alkyl, $C_{1-4}$alkoxy, —COOH and —SO$_3$H.

In any amino group as $R_5$ containing an unsubstituted or substituted $C_{5-6}$cycloalkyl group, this cycloalkyl group is preferably cyclohexyl which may contain up to three $C_{1-4}$alkyl groups.

Any heterocyclic amino group as $R_5$ is preferably a saturated 6-membered ring which may contain one further O or N. If substituted, this ring contains up to three $C_{1-4}$alkyl groups, more preferably up to three methyl groups.

Each $R_5$ is preferably $R_{5a}$, where each $R_{5a}$ is independently fluorine, chlorine or —NR$_8$R$_9$ in which each $R_8$ and $R_9$ is independently hydrogen, unsubstituted $C_{1-4}$alkyl, $C_{1-4}$alkyl monosubstituted by hydroxy, $C_{1-4}$alkoxy, —COOH, —SO$_3$H, —NH$_2$, —NHC$_{1-4}$alkyl or —N(C$_{1-4}$alkyl)$_2$, unsubstituted cyclohexyl, cyclohexyl substituted by 1 to 3 methyl groups, phenyl or phenyl (C$_{1-4}$alkyl), in which latter two groups the phenyl ring is unsubstituted or substituted by one or two groups selected from halogen, more preferably chlorine, $C_{1-4}$alkyl, $C_{1-4}$alkoxy, —SO$_3$H and —COOH, or $R_8$ and $R_9$ together with the nitrogen to which they are attached, form a piperidine-, morpholine- or piperazine-ring, which ring may contain up to three methyl groups.

More preferably, each $R_5$ is $R_{5b}$, where each $R_{5b}$ is independently fluorine, chlorine or —NR$_{8a}$R$_{9a}$ in which each $R_{8a}$ and $R_{9a}$ is independently hydrogen, $C_{1-2}$alkyl, $C_{1-3}$alkyl monosubstituted by hydroxy, —COOH or —SO$_3$H, phenyl or phenyl (C$_{1-2}$alkyl), which phenyl ring of the latter two groups is unsubstituted or substituted by one or two substituents selected from chlorine, methyl, methoxy, —SO$_3$H and —COOH, or $R_{8a}$ and $R_{9a}$, together with the nitrogen to which they are attached, form a piperidine-, morpholine-, piperazine- or N-methylpiperazine-ring.

Even more preferably, each $R_5$ is $R_{5c}$, where each $R_{5c}$ is independently chlorine or —NR$_{8b}$R$_{9b}$ in which each $R_{8b}$ and $R_{9b}$ is independently hydrogen, monohydroxy-substituted $C_{2-3}$alkyl or phenyl monosubstituted by methyl or sulpho.

Most preferably, each $R_5$ is $R_{5d}$, where each $R_{5d}$ is independently chlorine or —NHR$_{9c}$ in which $R_{9c}$ is hydrogen or 2-hydroxyethyl.

$R_6$ is preferably $R_{6a}$, where $R_{6a}$ is hydrogen, —CONH$_2$ or

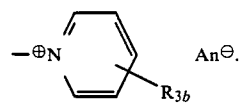

More preferably, it is $R_{6b}$, where $R_{6b}$ is hydrogen or —CONH$_2$; most preferably, $R_6$ is hydrogen.

Any non-chromophoric anion as An$^\ominus$ may be any organic or inorganic anion, e.g., conventional in the field of basic dyestuff chemistry, such as a chloride, bromide, sulphate, bisulphate, methylsulphate, oxalate, maleate, acetate, lactate, succinate, tartrate, methanesulphonate, etc. However, generally it is an anion of the reaction medium and therefore preferably a chloride or acetate ion.

Any alkyl as $R_7$ is preferably methyl or ethyl, especially methyl. Any cycloalkyl as $R_7$ is preferably cyclohexyl.

$R_7$ is preferably $R_{7a}$, where $R_{7a}$ is methyl, ethyl, benzyl or cyclohexyl. Most preferably, $R_7$ is methyl.

Any alkylene as W is preferably a linear polymethylene chain which may be interrupted by —NR$_{3b}$— or

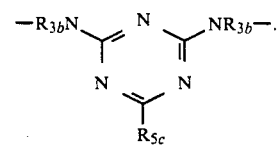

W is preferably $W_1$, where $W_1$ is —(CH$_2$)$_p$—, —(CH$_2$)$_q$—NR$_{3b}$—(CH$_2$)$_q$—,

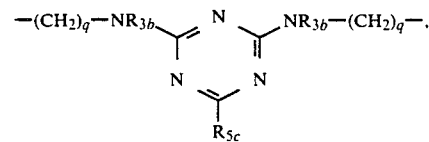

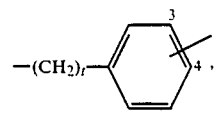

with the free bond in the 3- or 4-position

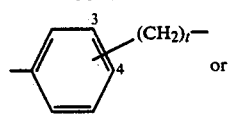

with the —(CH$_2$)$_t$—group
in the 3- or 4-position

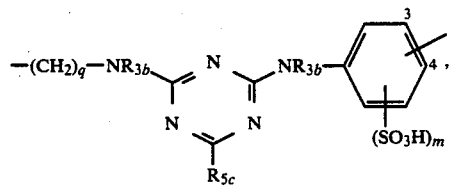

with the free bond in the 3- or 4-position in which p is 2, 3 or 4, each q is independently 2 or 3, and t is 1 or 2, and in which latter group —(CH$_2$)$_q$— is attached to the nitrogen of the pyridone ring, or W$_1$ together with —NR$_3$—(Y) forms

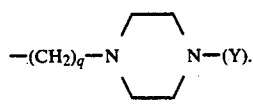

More preferably, W is W$_2$, where W$_2$ is —(CH$_2$)$_q$— or

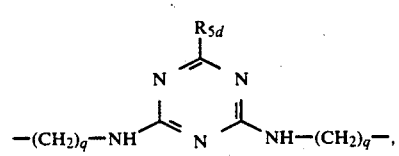

or W$_2$ together with —NR$_3$—(Y)

forms 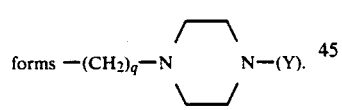

Most preferably, W is W$_3$, where W$_3$ is —(CH$_2$)$_q$—.

Any fibre-reactive group as Y is preferably Y$_a$, where Y$_a$ is a group selected from (a) to (l),

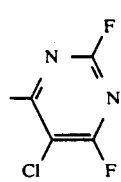 (a)

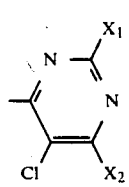 (b)

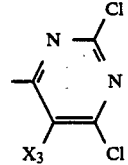 (c)

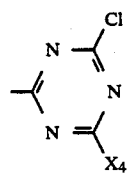 (d)

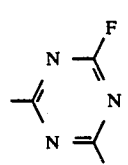 (e)

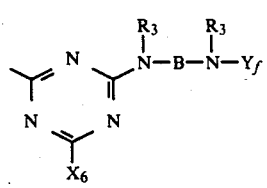 (f)

—CO—Y$_g$ (g)

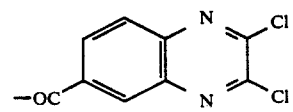 (h)

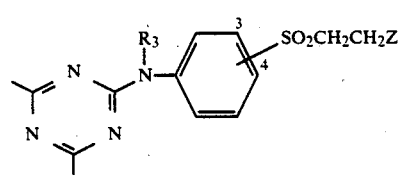 (i)

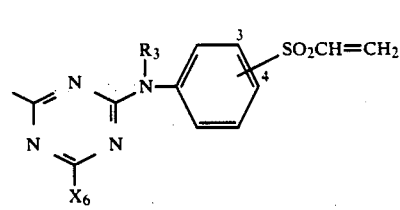 (j)

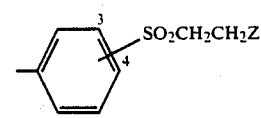 (k)

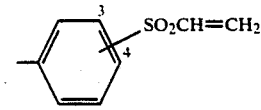 (l)

in which in the latter four groups (i) to (l) each —SO$_2$CH$_2$CH$_2$Z and —SO$_2$—CH=CH$_2$ is attached to the 3- or 4-position of the phenyl group, and in which X$_1$ is fluorine or —SO$_2$C$_{1-4}$alkyl, $X_2$ is $C_{1-4}$alkyl or $C_{1-4}$haloalkyl, $X_3$ is hydrogen or chlorine, $X_4$ is chlorine, hydroxy, $C_{1-4}$alkoxy, phenoxy in which the phenyl group is unsubstituted or substituted by 1 or 2 substituents selected from halogen, $C_{1-4}$alkyl, $C_{1-4}$alkoxy and —SO$_3$H or —NR$_8$R$_9$, $X_5$ is —NR$_8$R$_9$, each $X_6$ is independently fluorine, chlorine or —NR$_8$R$_9$, each $R_3$ and each $R_8$ and $R_9$ are as defined above, B is an aliphatic, cycloaliphatic, aromatic or aromatic-aliphatic bridge member, or B together with both —NR$_3$— to which it is attached forms the ring

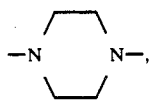

or

B together with one of the two —NR$_3$— groups forms

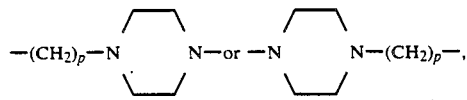

$Y_f$ is one of the groups (a), (b), (c), (d), (e), (i) and (j), $Y_g$ is —CH=CH$_2$, —CH$_2$Cl,

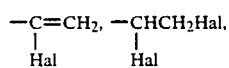

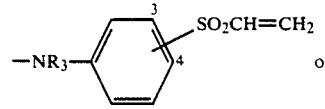

or

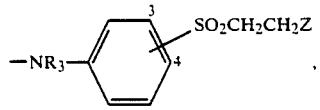

in which latter two groups each sulphonyl group is bound to the 3- or 4-position, each Hal is independently chlorine or bromine, and Z is a group capable of being split off.

$X_1$ is preferably $X_{1a}$, where $X_{1a}$ is fluorine or —SO$_2$CH$_3$.

$X_2$ is preferably $X_{2a}$, where $X_{2a}$ is methyl or —CH$_2$Cl.

$X_4$ is preferably $X_{4a}$, where $X_{4a}$ is chlorine, hydroxy, methoxy or —NR$_{8a}$R$_{9a}$; more preferably, it is $X_{4b}$, where $X_{4b}$ is chlorine, hydroxy or —NR$_{8b}$R$_{9b}$; most preferably, it is $X_{4c}$, where $X_{4c}$ is chlorine or —NHR$_{9c}$.

$X_5$ is preferably $X_{5a}$, where $X_{5a}$ is —NR$_{8a}$R$_{9a}$; more preferably, it is $X_{5b}$, where $X_{5b}$ is —NR$_{8b}$R$_{9b}$.

Each $X_6$ is preferably $X_{6a}$, where each $X_{6a}$ is independently fluorine, chlorine or —NR$_{8a}$R$_{9a}$; more preferably, it is $X_{6b}$, where each $X_{6b}$ is independently chlorine or —NR$_{8b}$R$_{9b}$.

B is preferably B$_1$, where B$_1$ is —C$_{2-4}$alkylene-, monohydroxysubstituted—C$_{3-4}$alkylene-,

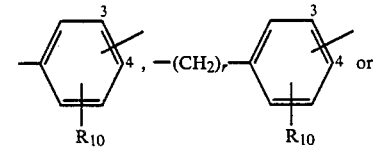

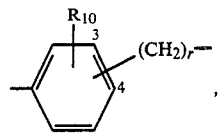

in which
in the latter three phenyl groups each bridging bond and —(CH$_2$)$_r$-group, respectively, is in the 3- or 4-position, r is 1, 2 or 3, and R$_{10}$ is hydrogen, chlorine, methyl, methoxy, —SO$_3$H or —COOH, or B$_1$ together with both —NR$_3$— radical to which it is attached, forms the ring

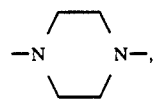

or

B$_1$ together with one of both —NR$_3$— radicals forms

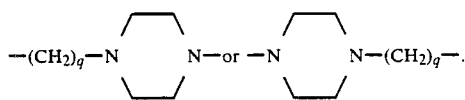

More preferably, B is B$_2$, where B$_2$ is —C$_{2-3}$alkylene,

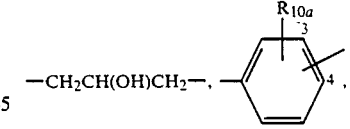

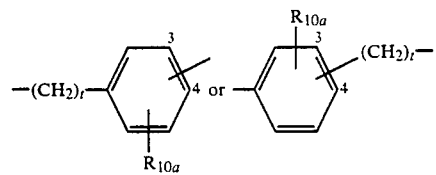

in which in the latter three phenyl groups each bridging bond and —(CH$_2$)$_r$— group, respectively, is in the 3- or 4-position, and R$_{10a}$ is hydrogen, methyl or —SO$_3$H, or B$_2$, together with both —NR$_3$— radicals to which it is attached, forms a piperazine ring.

Any Z capable of being split off is preferably Z$_a$, where Z$_a$ is chlorine, —OSO$_3$H, —SSO$_3$H or —O-COC$_{1-4}$alkyl.

(b) is preferably (b$_1$), where (b$_1$) is a group (b) in which $X_1$ is $X_{1a}$ and $X_2$ is $X_{2a}$.

(d) is preferably (d$_1$), where (d$_1$) is a group (d) in which $X_4$ is $X_{4a}$; more preferably, it is (d$_2$), where (d$_2$) is a group (d) in which $X_4$ is $X_{4b}$; most preferably, it is (d$_3$), where (d$_3$) is a group (d) in which $X_4$ is $X_{4c}$.

(e) is preferably (e₁), where (e₁) is a group (e) in which X₅ is X₅ₐ; more preferably, it is (e₂), where (e₂) is a group (e) in which X₅ is X₅ᵦ.

(f) is preferably (f₁)

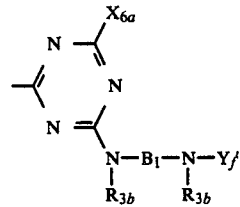

in which Y_f' is one of the groups (a), (b₁), (c), (d₁) and (e₁); more preferably, it is (f₂)

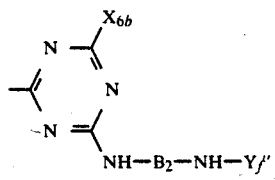

in which Y_f'' is one of the groups (a), (c), (d₂) and (e₂), most preferably Y_f'' is (a).

Preferably, (g) is (g₁), where (g₁) is —CO—Y_g' in which Y_g' is

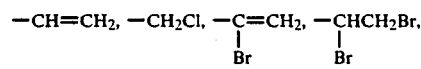

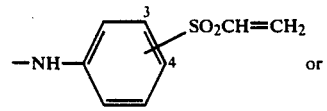

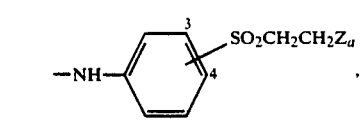

in which latter two groups each sulphonyl group is bound to the 3- or 4-position.

Preferably, (i) is (i₁), where (i₁) is a group (i) in which X₆ is X₆ᵦ, R₃ is hydrogen and Z is Z_a.

Preferably, (j) is (j₁), where (j₁) is a group (j) in which X₆ is X₆ᵦ and R₃ is hydrogen.

(k) is preferably (k₁), where (k₁) is a group (k) in which Z is Z_a.

More preferably, Y is Y_b, where Y_b is one of the groups (a), (b₁), (c), (d₁), (e₁), (f₁), (g₁), (i₁), (j₁), (k₁) and (l). Even more preferably, Y is Y_c, where Y_c is one of the groups (a), (b₁), (c), (d₂), (e₂) and (f₂). Most preferably, Y is Y_d, where Y_d is (a) or (d₃).

Preferably, n is 0.

a is preferably 2 or 3, b is preferably 0 or 1, more preferably 0, and c is preferably 1.

Representative groups of compounds of formula I are those wherein Me is copper or nickel and
 (1) each R₁ and R₂ is hydrogen,
 (2) each R₄ is independently R_{4c},
 (3) each R₅ is independently R_{5a},
 (4) R₆ is R_{6b},
 (5) R₆ is R_{6b}, and R₇ is R_{7a}, and
 (6) Y is Y_a.

Preferred compounds correspond to formula Ia

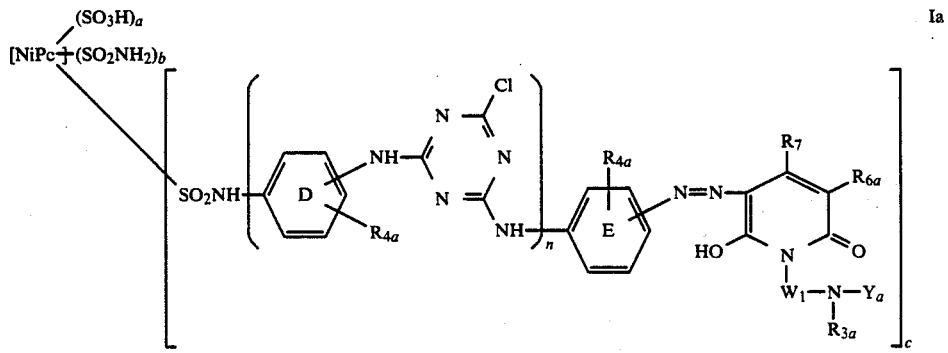

in which compounds are in free acid or salt form, and mixtures thereof.

More preferred are compounds of formula Ia in which
 (1) each R_{4a} is independently R_{4b};
 (2) R_{6a} is R_{6b};
 (3) R₇ is R_{7a};
 (4) W₁ is W₂ and R_{3a} is R_{3b};
 (5)–(8) those of (1)–(4) wherein a is 2 or 3, b is 0 or 1, preferably 0, and c is 1, and mixtures of such compounds, particularly mixtures of compounds wherein the variables R_{3a}, R_{4a} (when a compound has two R_{4a}'s, they may be the same or different), R_{6a}, R₇, W₁, Y_a, b, c and n and the positions of the floating groups on Rings D and E are the same but which differ with respect to a and the positions of the substituents on the phthalocyanine nucleus.

Even more preferred are compounds of formula Ib,

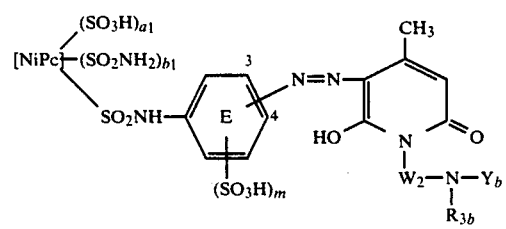

which compounds are in free acid or salt form, in which the azo group is bound to the 3- to 4-position of the phenyl ring, m is 0 or 1,
a₁ is 2 or 3, and $b_1$ is 0 or 1, preferably 0, with the proviso that $a_1+b_1$ do not exceed 3,
and mixtures of such compounds, particularly mixtures of compounds wherein the variables $R_{3b}$, $W_2$, $Y_b$, $b_1$ and m and the positions of the floating group(s) on Ring E are the same but which differ with respect to a and the positions of the substituents on the phthalocyanine nucleus.

Most preferred are compounds of formula Ib in which
(1) $Y_b$ is $Y_c$;
(2) $Y_b$ is $Y_d$;
(3) those of (1) or (2), in which $W_2$ is $W_3$;
(4)–(6) those of (1)–(3) wherein $b_1$ is 0,
and mixtures of such compounds, particularly mixtures of the compounds wherein the variables $R_{3b}$, $W_2$, $Y_b$, $b_1$ and m and the positions of the floating group(s) on Ring E are the same but which differ with respect to a and the positions of the substituents on the phthalocyanine nucleus.

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted or substituted ammonium cations, e.g., lithium, sodium, potassium, ammonium, mono-, di-, tri- and tetramethylammonium, triethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The present invention further provides a process for the preparation of compounds of formula I comprising reacting the diazonium salt of a compound of formula II of a compound Y-hal in which hal is fluorine, chlorine or bromine.

The coupling reaction with the pyridone compound of formula III may be carried out in accordance with known methods, suitably at temperatures of 0°–10° C. in an aqueous alkaline medium.

Preferably, a compound of formula III in which $Y_x$ is hydrogen is used as coupling component.

Similarly, the condensation necessary to introduce the fibre-reactive group Y may be effected in accordance with known methods.

The compounds of formula I may be isolated in accordance with known methods, for example, by conventional salting out with alkali metal salt, filtering and drying optionally in vacuo and at elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

The starting compounds of formulae II and III are either known or may be prepared in accordance with known methods using known starting compounds. Compounds of formula II, for example, may be prepared by sulphochlorination of a phthalocyanine compound which is conventional in the field of phthalocyanine dyes and subsequent reaction with the appropriate diamine and optionally with an amine $HNR_1R_2$.

The compounds of formula I and mixtures thereof are useful as fibre-reactive dyestuffs for dyeing or printing hydroxy group- or nitrogen-containing organic substrates. Preferred substrates are leather and fibre material containing or consisting of natural or synthetic polyamides and, particularly, of natural or regenerated cellulose such as cotton, viscose and spun rayon. The most preferred substrate is textile material containing or consisting of cotton.

Dyeing or printing is effected in accordance with known methods conventional in the fibre-reactive dyestuff field at temperatures within the range of 30° to 100° C. Preferably, the exhaust dyeing method is used.

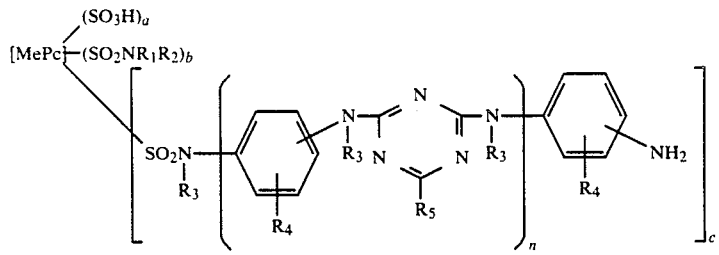

II which compound is in free acid or salt form, with at least c moles of a compound which, in one of the possible tautomeric forms, corresponding to formula III,

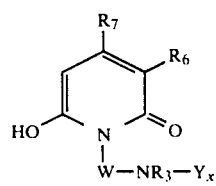

III in which $Y_x$ is hydrogen or a fibre-reactive group Y, and furthermore, if $Y_x$ is hydrogen, with at least c moles The compounds of this invention are well compatible with other fibre-reactive dyes; they may be applied per se or in combination with appropriate fibre-reactive dyestuffs of the same class having analogous dyeing properties, e.g., concerning common fastness properties, extent of ability to exhaust from the dyebath onto the fibre etc. The dyeings obtained with such combination mixtures have good fastness properties and are comparable to those obtained with a single dyestuff.

In view of their good build-up power the compounds of formula I give high exhaust and fixation yields. The portion of unfixed dyestuff can be easily washed off the substrate. The dyeings and prints obtained show notably good dry and wet light fastness properties without catalytic fading. Furthermore, they show good wet fastness properties such as wash, water, sea water and sweat fastness, and they are stable to oxidative influences, e.g., chlorinated water, hypochlorite bleach and peroxide or perborate containing wash liquors.

trifluoropyrimidine are added, and and the reaction mixture is stirred at 0°-5° for three hours. Simultaneously, the pH is kept at 8 by the addition of sodium carbonate. After condensation is completed, the reaction mixture is salted out with 45 parts of sodium chloride. The dyestuff which precipitates is then filtered by suction and dried at 40°. The dyestuff having the formula

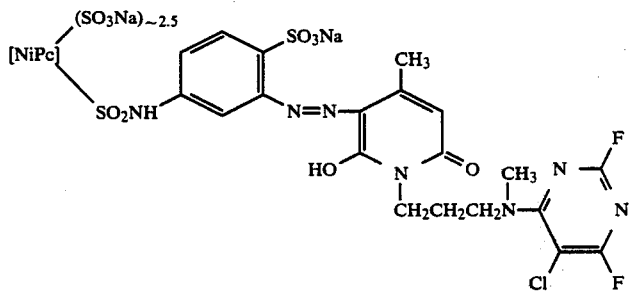

It is a further advantage that dyeing with compounds of formula I, normally applied at temperatures higher than 60° C., is not temperature dependent in the usual dyeing temperature range. Therefore, dyeing may be effected almost equally well at 80° C. as at 100° C. without any essential loss of fixation yield, and dyeings of practically the same colour strength are obtained.

The following examples further serve to illustrate the invention. In the examples all parts and percentages are by weight or volume. The temperatures are in degrees Centigrade.

EXAMPLE 1

25.5 Parts of the dye base, prepared in accordance with known methods by sulphochlorinating nickel phthalocyanine and then reacting with 1,3-diaminobenzene-4-sulphonic acid, containing per molecule ca. 2.5 sulphonic acid groups and 1 sulphonamido group, are stirred into a solution of 1.8 parts of sodium nitrite in 150 parts of water. This solution, which is cooled to 0°-2°, is added dropwise to 100 parts of an ice-water mixture and 12 parts of 30% hydrochloric acid. The resulting diazonium salt suspension is then added to a solution consisting of 5.9 parts of 1-(3'-methylaminopropyl)-6-hydroxy-4-methylpyridone-(2) in 300 parts of ice-water, whilst keeping a temperature of 0°-5°. During coupling, the pH of the mixture is kept at 9-9.5 by adding 30% sodium hydroxide solution. A green solution ($L_1$) is obtained to which 5 parts of 5-chloro-2,4,6- is obtained which dyes cellulose material a brilliant green shade and shows a good build-up power. The dyeings and prints on cotton obtained in accordance with conventional methods have high light fastness (dry and wet) and perfect wet fastness properties. Furthermore, they are resistant to oxidative influences.

EXAMPLE 2

According to the method given in Example 1, 5.6 parts of cyanuric chloride, instead of 5 parts of 5-chloro-2,4,6-trifluoropyrimidine, are used for the condensation with the solution $L_1$. After one hour the reaction is completed, and the dyestuff is isolated in accordance with the method described in Example 1. The dyestuff having the formula

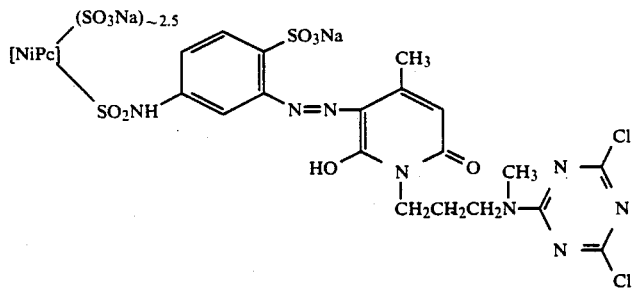

is obtained which dyes cellulose material a brilliant green shade. The dyeings and prints on cotton show notably good light and wet fastness properties.

EXAMPLE 3

37 Parts of the dyestuff obtained according to the method described in Example 2 are dissolved in 370 parts water. Then 200 parts ice and 2 parts of monoethanolamine are added, and the mixture is stirred for one hour at 0°-5°. Simultaneously, the pH is kept at 10 by adding ca. 3 parts of 30% sodium hydroxide solution. The dyestuff is isolated in accordance with the method given in Example 1. The dye-stuff thus obtained having the formula

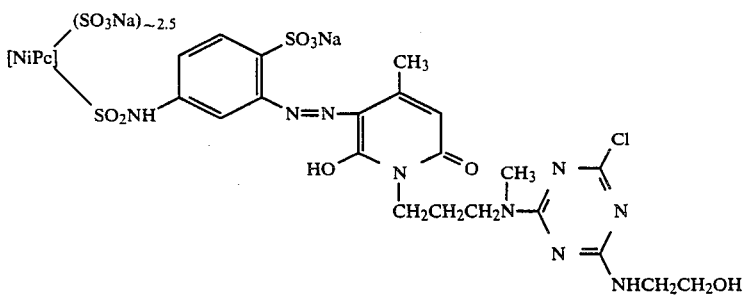

dyes cellulose material a brilliant green shade. Dyeing with this dye-stuff is not temperature dependent and may be effected almost equally well at 80° as at 98° resulting in dyeings with similar colour strength. The dyeings and prints on cotton show notably good light and wet fastness properties and are stable to oxidative influences.

EXAMPLES 4 TO 15/TABLE 1

By analogy with the method described in Example 1, 2 or 3, using appropriate starting compounds, further compounds of formula I may be prepared which are listed in the following table. These compounds correspond to formula A

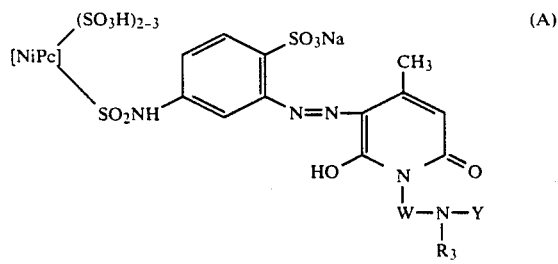

in which the symbols are as defined in Table 1. For Y, the following symbols defined below are used in Table 1 and the further tables which will follow:

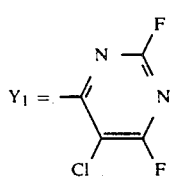

-continued

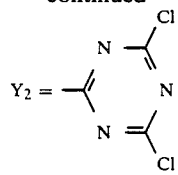

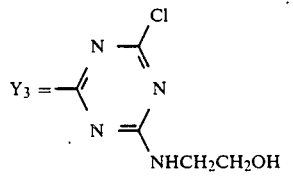

The dyeings and prints on cotton obtained with these compounds of Examples 4 to 15 have a brilliant green shade. They show high light and wet fastness properties.

TABLE 1

| Ex. No. | Compounds of formula A | | |
|---|---|---|---|
| | —W— | $R_3$ | Y |
| 4 | —CH$_2$CH$_2$— | H | $Y_1$ |
| 5 | " | H | $Y_2$ |
| 6 | " | H | $Y_3$ |
| 7 | " | —CH$_3$ | $Y_1$ |
| 8 | " | " | $Y_2$ |
| 9 | " | " | $Y_3$ |
| 10 | —CH$_2$CH$_2$CH$_2$— | H | $Y_1$ |
| 11 | " | H | $Y_2$ |
| 12 | " | H | $Y_3$ |
| 13 | —CH$_2$CH$_2$— | —CH$_2$CH$_3$ | $Y_1$ |
| 14 | " | " | $Y_2$ |
| 15 | " | " | $Y_3$ |

EXAMPLES 6 TO 116/TABLES 2 TO 4

By analogy with the method described in Example 1, 2 or 3 further compounds of formula I may be prepared using appropriate starting compounds. They correspond to formula B

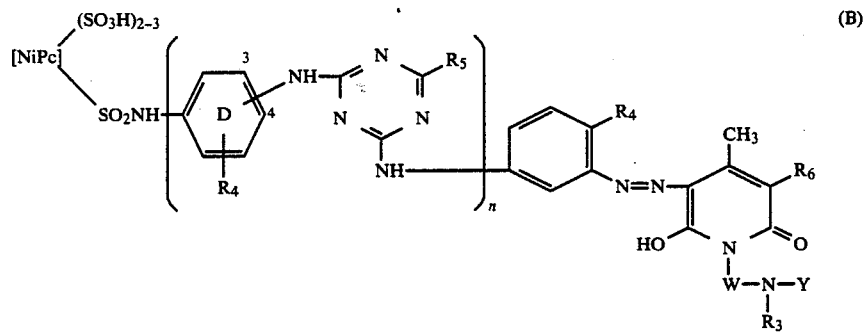

(B)

in which the symbols are as defined in Tables 2 to 4.

EXAMPLES 16 TO 48/TABLE 2

For these compounds, listed in Table 2, n is 0. They dye cellulose material a brilliant green shade. The dyeings and prints obtained show valuable fastness properties such as light and wet fastnesses.

TABLE 2

Compounds of formula B in which n is 0

| Ex. No. | $R_4$ | $R_6$ | $-W-NR_3-$ | Y |
|---|---|---|---|---|
| 16 | $-SO_3H$ | $-CONH_2$ | $-CH_2CH_2CH_2NH-$ | $Y_1$ |
| 17 | H | H | " | $Y_1$ |
| 18 | H | $-CONH_2$ | " | $Y_1$ |
| 19 | $-SO_3H$ | " | $-CH_2CH_2CH_2N(CH_3)-$ | $Y_1$ |
| 20 | " | " | " | $Y_3$ |
| 21 | H | H | " | $Y_1$ |
| 22 | H | H | " | $Y_2$ |
| 23 | H | H | " | $Y_3$ |
| 24 | $-SO_3H$ | $-CONH_2$ | $-CH_2CH_2NH-$ | $Y_1$ |
| 25 | " | " | " | $Y_2$ |
| 26 | H | " | " | $Y_1$ |
| 27 | H | H | " | $Y_1$ |
| 28 | H | H | $-CH_2CH_2NH-$ | $Y_3$ |
| 29 | H | H | $-CH_2CH_2N\overset{\frown}{N}-$ (piperazine) | $Y_1$ |
| 30 | $-SO_3H$ | H | " | $Y_1$ |
| 31 | " | H | " | $Y_2$ |
| 32 | " | H | " | $Y_3$ |
| 33 | " | $-CONH_2$ | " | $Y_1$ |
| 34 | " | H | $-CH_2CH_2NH-$[triazine with $-NHCH_2CH_2NH-$ and Cl] | $Y_1$ |
| 35 | " | H | " | $Y_3$ |
| 36 | " | H | $-CH_2CH_2NH-$[triazine with $-NH-C_6H_4-SO_3H$ and $-NHCH_2CH_2NH-$] | $Y_1$ |
| 37 | " | H | " | $Y_2$ |

TABLE 2-continued

Compounds of formula B in which n is 0

| Ex. No. | R₄ | R₆ | —W—NR₃— | Y |
|---|---|---|---|---|
| 38 | " | H | —CH₂CH₂NH—C(=N)—N=C(NHCH₂CH₂NH—)—N=C(NH-C₆H₄-SO₃H)— (triazine with NHCH₂CH₂NH— and NH-phenyl-SO₃H substituents) | Y₁ |
| 39 | " | H | " | Y₃ |
| 40 | H | H | " | Y₁ |
| 41 | H | H | " | Y₂ |
| 42 | —SO₃H | H | —CH₂CH₂NH—C(=N)—N=C(NHCH₂CH₂NH—)—N=C(NH₂)— | Y₁ |
| 43 | " | H | " | Y₂ |
| 44 | —SO₃H | H | —CH₂CH₂NH—C(=N)—N=C(NH₂)—N=C(NHCH₂CH₂NH—)— | Y₃ |
| 45 | " | —CONH₂ | " | Y₃ |
| 46 | " | H | —CH₂CH₂NH—C(=N)—N=C(NH-C₆H₃(SO₃H)-NH—)—N=C(Cl)— | Y₁ |
| 47 | " | H | —CH₂CH₂NH—C(=N)—N=C(Cl)—N=C(NH-C₆H₃(SO₃H)-NH—)— | Y₁ |
| 48 | " | H | " | Y₃ |

EXAMPLES 49 TO 71/TABLE 3

For these compounds, listed in Table 3, n is 1 and R₂ is —SO₃H. They dye cellulose material a brilliant green shade, and their dyeings and prints show good fastness properties.

TABLE 3

Compounds of formula (B) in which n is 1 and R₄ is —SO₃H

| Ex. No. | R'₄ (position) | linkage with ring D in position | R₅ | R₆ | —W—NR₃— | Y |
|---|---|---|---|---|---|---|
| 49 | —SO₃H(4) | 3 | Cl | H | —CH₂CH₂NH— | Y₁ |
| 50 | " | 3 | Cl | H | " | Y₃ |
| 51 | —SO₃H(3) | 4 | Cl | H | " | Y₁ |

TABLE 3-continued

Compounds of formula (B) in which n is 1 and $R_4$ is —$SO_3H$

| Ex. No. | $R'_4$ (position) | linkage with ring D in position | $R_5$ | $R_6$ | —W—$NR_3$— | Y |
|---|---|---|---|---|---|---|
| 52 | —$SO_3H(4)$ | 3 | Cl | —$CONH_2$ | " | $Y_1$ |
| 53 | " | 3 | —$NH_2$ | H | " | $Y_1$ |
| 54 | " | 3 | " | H | " | $Y_3$ |
| 55 | " | 3 | " | H | —$CH_2CH_2GH_2NH$— | $Y_1$ |
| 56 | " | 3 | " | H | " | $Y_2$ |
| 57 | H | 3 | 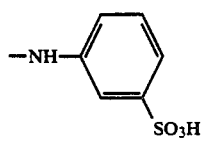 | H | —$CH_2CH_2NH$— | $Y_1$ |
| 58 | —$SO_3H(4)$ | 3 | Cl | H | 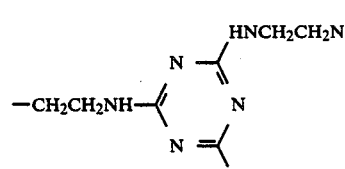 | $Y_1$ |
| 59 | " | 3 | Cl | —$CONH_2$ | " | $Y_1$ |
| 60 | " | 3 | Cl | H | —$CH_2CH_2CH_2NH$— | $Y_1$ |
| 61 | —$SO_3H(3)$ | 4 | Cl | H | " | $Y_1$ |
| 62 | H | 4 | 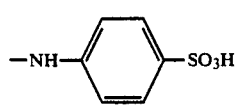 | H | " | $Y_1$ |
| 63 | —$SO_3H(4)$ | 3 | Cl | H | 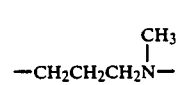 | $Y_1$ |
| 64 | " | 3 | Cl | H | " | $Y_3$ |
| 65 | " | 3 | —$N(CH_2CH_2OH)_2$ | H | —$CH_2CH_2NH$— | $Y_1$ |
| 66 | " | 3 | —$NHCH_2CH_2OH$ | H | " | $Y_1$ |
| 67 | —$SO_3H(4)$ | 3 | —$NHCH_2CH_2OH$ | H | 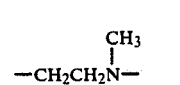 | $Y_3$ |
| 68 | " | 3 | " | H | " | $Y_1$ |
| 69 | " | 3 | Cl | H | 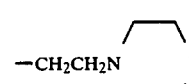 | $Y_1$ |
| 70 | —$SO_3H(3)$ | 4 | Cl | H | " | $Y_1$ |
| 71 | H | 3 | 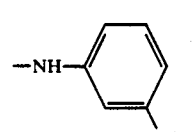 | H | " | $Y_1$ |

EXAMPLES 72 TO 116/TABLE 4

For these compounds, listed in Table 4, $R_6$ is hydrogen. For Y, the following symbols $Y_4$ to $Y_{15}$ as defined below are used.

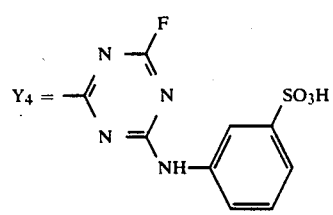

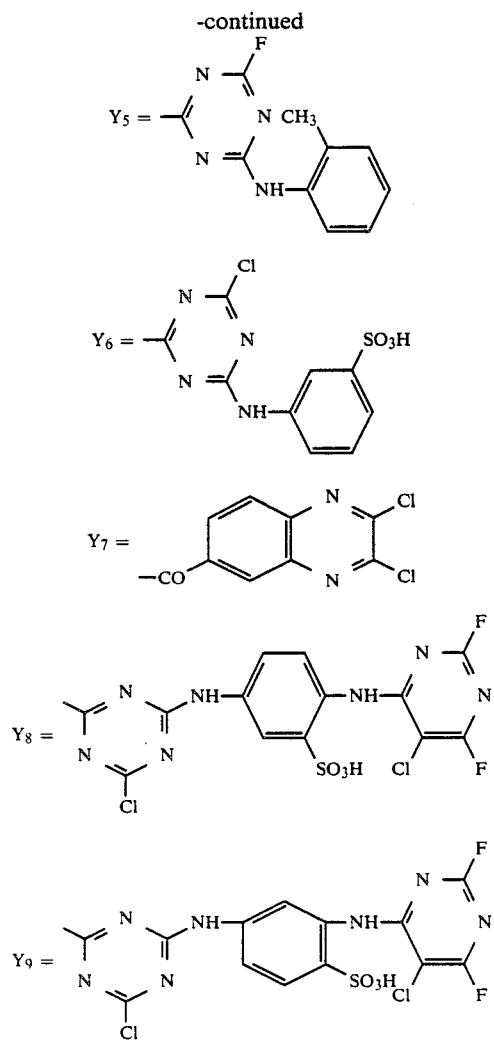
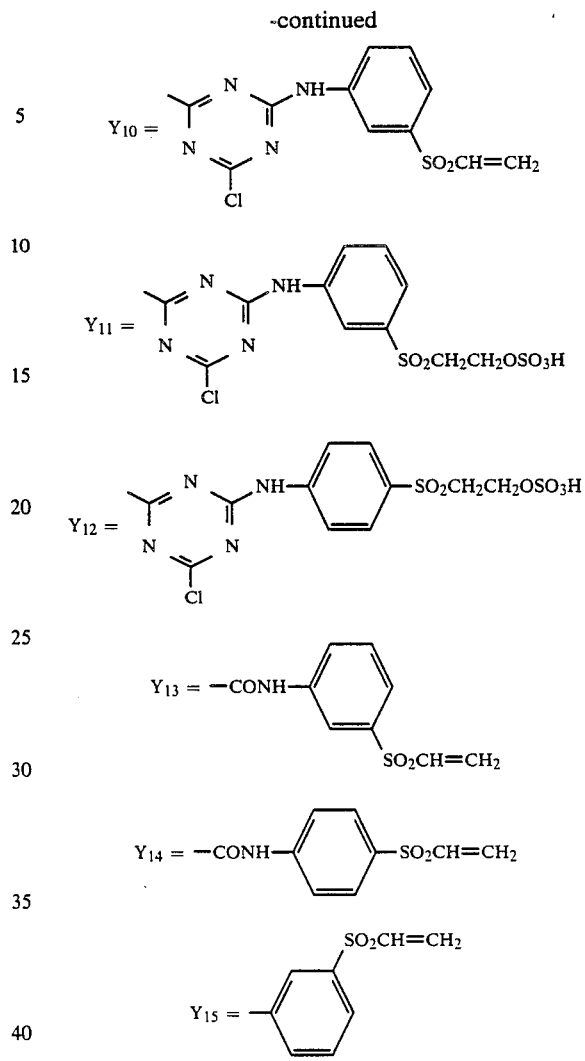
TABLE 4
Compounds of formula B in which $R_6$ is hydrogen
| Ex. No. | n | $R'_4$ (position) | linkage with ring D in position | $R_5$ | $R_4$ | $-W-NR_3-$ | Y |
|---|---|---|---|---|---|---|---|
| 72 | 0 | — | — | — | $-SO_3H$ | $-CH_2CH_2NH-$ | 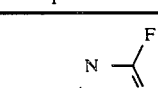 |
| 73 | 0 | — | — | — | " | " | 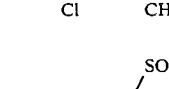 |

TABLE 4-continued
Compounds of formula B in which R₆ is hydrogen
| Ex. No. | n | R'₄ (position) | linkage with ring D in position | R₅ | R₄ | —W—NR₃— | Y |
|---|---|---|---|---|---|---|---|
| 74 | 0 | — | — | — | " | " | 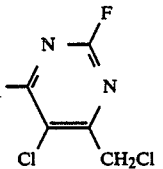 |
| 75 | 0 | — | — | — | H | " | " |
| 76 | 1 | —SO₃H(4) | 3 | Cl | —SO₃H | " | " |
| 77 | 1 | —SO₃H(4) | 3 | —NHCH₂CH₂OH | —SO₃H | —CH₂CH₂NH— | 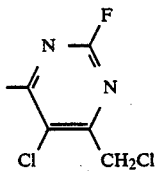 |
| 78 | 1 | " | 3 | −NH−⟨⟩−SO₃H | H | " | " |
| 79 | 0 | — | — | — | H | —CH₂CH₂CH₂NH— | " |
| 80 | 0 | — | — | — | H | —CH₂CH₂CH₂N(CH₃)— | " |
| 81 | 0 | — | — | — | —SO₃H | " | " |
| 82 | 0 | — | — | — | " | " | 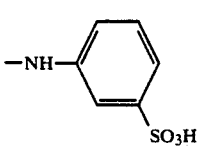 |
| 83 | 0 | — | — | — | " | —CH₂CH₂CH₂NH— | " |
| 84 | 0 | — | — | — | H | —CH₂CH₂NH— | 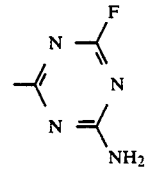 |
| 85 | 0 | — | — | — | —SO₃H | " | " |
| 86 | 0 | — | — | — | " | " | 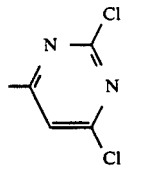 |
| 87 | 0 | — | — | — | " | —CH₂CH₂N⟨piperazine⟩N— | 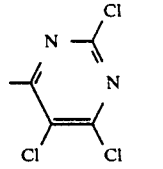 |

TABLE 4-continued

Compounds of formula B in which $R_6$ is hydrogen

| Ex. No. | n | $R'_4$ (position) | linkage with ring D in position | $R_5$ | $R_4$ | $-W-NR_3-$ | Y |
|---|---|---|---|---|---|---|---|
| 88 | 0 | — | — | — | H | $-CH_2CH_2NH-$ | triazine with F, $CH_3$, $HNCH_2CH_2OH$ |
| 89 | 1 | $-SO_3H(4)$ | 3 | Cl | $-SO_3H$ | " | triazine with F, $CH_3$, $N(CH_2CH_2OH)_2$ |
| 90 | 1 | " | 3 | Cl | H | " | $Y_4$ |
| 91 | 0 | — | — | — | H | $-CH_2CH_2CH_2NH-$ | triazine with Cl, $CH_3$, OH |
| 92 | 1 | $-SO_3H(3)$ | 4 | $-NH_2$ | $-SO_3H$ | " | triazine with Cl, $CH_3$, $NH_2$ |
| 93 | 0 | — | — | — | " | $-CH_2CH_2N\underset{\phantom{x}}{\diagup}N-$ (piperazine) | triazine with Cl, $CH_3$, $N(CH_2CH_2OH)_2$ |
| 94 | 0 | — | — | — | " | $-CH_2CH_2CH_2NH-$ | $-COCH_2Cl$ |
| 95 | 0 | — | — | — | H | $-CH_2CH_2NH-$ | $-COCH=CH_2$ |
| 96 | 0 | — | — | — | H | " | $-COC=CH_2$ with Br |
| 97 | 1 | $-SO_3H(3)$ | 4 | $-NH_2$ | $-SO_3H$ | $-CH_2CH_2NH-$ | $-COCHCH_2Br$ with Br |
| 98 | 0 | — | — | — | " | " | $Y_{13}$ |
| 99 | 0 | — | — | — | H | $-CH_2CH_2CH_2NH-$ | $Y_{14}$ |
| 100 | 1 | $-SO_3H(4)$ | 3 | Cl | H | " | $Y_{15}$ |
| 101 | 0 | — | — | — | $-SO_3H$ | $-CH_2CH_2NH-$ | $Y_5$ |
| 102 | 0 | — | — | — | " | $-CH_2CH_2CH_2N-$ with $CH_3$ | $Y_5$ |
| 103 | 0 | — | — | — | " | " | triazine with Cl, $CH_3$, $OCH_3$ |
| 104 | 0 | — | — | — | H | $-CH_2CH_2CH_2NH-$ | " |
| 105 | 0 | — | — | — | H | $-CH_2CH_2NH-$ | $Y_6$ |
| 106 | 0 | — | — | — | $-SO_3H$ | " | $Y_7$ |
| 107 | 0 | — | — | — | " | " | $Y_8$ |
| 108 | 1 | H | 3 | Cl | " | " | $Y_8$ |
| 109 | 0 | — | — | — | " | " | $Y_9$ |

TABLE 4-continued

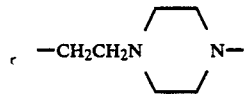

| Ex. No. | n | R'₄ (position) | linkage with ring D in position | R₅ | R₄ | —W—NR₃— | Y |
|---|---|---|---|---|---|---|---|
| 110 | 0 | — | — | — | " | —CH₂CH₂N⟨N—⟩ | Y₉ |
| 111 | 0 | — | — | — | H | —CH₂CH₂NH— | Y₉ |
| 112 | 0 | — | — | — | —SO₃H | " | Y₁₀ |
| 113 | 0 | — | — | — | " | " | Y₁₁ |
| 114 | 0 | — | — | — | H | " | Y₁₂ |
| 115 | 0 | — | — | — | —SO₃H | —CH₂CH₂N(CH₃)— | Y₉ |
| 116 | 0 | — | — | — | " | —CH₂CH₂CH₂NH— | Y₉ |

The compound of Examples 72 to 116 dye cellulose material a brilliant green shade. The dyeings and prints obtained show good light and wet fastness properties.

Each of the dyes of Examples 1–116 is at least predominantly a mixture of compounds wherein a is 2 or 3. In Examples 1–3 the average value of a is about 2.5 and in Examples 4–116 it is between 2 and 3 and preferably is about 2.5.

In accordance with the method as described the dyestuffs of Examples 1 to 116 are obtained in sodium salt form. They may, depending on the reaction/isolation conditions or by reacting the sodium salts in accordance with known methods, also be obtained in free acid form or in other salt forms, for example those salt forms containing one or more cations indicated in the description above.

In the following examples the application of the compounds of this invention is illustrated.

APPLICATION EXAMPLE A 0.3 Parts of the dyestuff of Example 1 are dissolved in 300 parts of demineralised water and 15 parts of Glauber's salt (calcined) are added. The dyebath is heated to 40°, then 10 parts of cotton fabric (bleached) are added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 parts of a commercially available anion-active detergent. After rinsing with running hot water (for 3 minutes) and centrifuging, the dyeing is dried in a cabinet dryer at ca. 70°. A brilliant green cotton dyeing with good build-up is obtained showing good fastness properties, and especially good light fastness.

APPLICATION EXAMPLE B

By a modified method as described in Application Example A, instead of a total of 6 parts sodium carbonate which are added portionwise, only 2 parts of calcined sodium carbonate are added in one portion. The starting temperature of 40° is raised to 60°, and dyeing is effected for a further one hour. Otherwise, the method given in Application Example A is employed. A brilliant green cotton dyeing of good build-up is obtained showing notably good light fastness properties.

APPLICATION EXAMPLE C

To a dyebath consisting of 1000 parts of water, 20 parts of Glauber's salt (calcined), 2.5 parts of sodium carbonate (calcined) and 1 part of the sodium 1-nitrobenzene-3-sulphonate 50 parts of mercerized cotton fabric are added. The bath is heated to 40°, then 1.0 parts of the dyestuff of Example 3 are added. The temperature is raised to 98° within 45 minutes; during this time 20 parts of Glauber's salt (calcined) are added after 15 minutes and again 20 parts of Glauber's salt (calcined) are added after further 15 minutes. At the end of this time 7.5 parts of sodium carbonate (calcined) are added. Dyeing is continued at the boil for 45 to 60 minutes. Subsequently, the dyed fabric is removed from the liquor, rinsed with running hot water and washed at the boil according to the method given for Application Example A. After rinsing and drying a brilliant green cotton dyeing of good light fastness and wet fastness properties is obtained.

APPLICATION EXAMPLE D 2.5 Parts of the dyestuff of Example 3 are dissolved in 2000 parts water. 100 Parts of cotton fabric are added, and the temperature of the dyebath is raised to 80° within 10 minutes. 100 Parts of Glauber's salt (calcined) are added and 30 minutes thereafter, 20 parts of sodium carbonate (calcined). Dyeing is continued for one hour at 80°. Subsequently, the dyed fabric is rinsed with running cold, then hot water, and is washed at the boil according to the method given for Application Example A. After rinsing and drying a brilliant green cotton dyeing is obtained having good fastness properties.

Similarly, the dyestuffs of Examples 2 and 4–116 or mixtures of the exemplified dyestuffs may be employed to dye cotton in accordance with the methods of Application Examples A to D.

APPLICATION EXAMPLE E

A printing paste consisting of 40 parts of the dyestuff of Example 1

-continued

| |
|---|
| 100 parts of urea |
| 350 parts of water |
| 500 parts of a 4% sodium alginate thickener and |
| 10 parts of sodium bicarbonate |
| 1000 parts | is applied to cotton fabric in accordance with a conventional printing method.

The printed fabric is dried and fixed in steam at 102°–104° for 4–8 minutes. It is rinsed in cold and then hot water, washed at the boil (according to the method described in Application Example A) and dried. A brilliant green print is obtained which has good general fastness properties.

Similarly, the dyestuffs of Examples 2-116 or mixtures of the exemplified dyestuffs may be employed to print cotton in accordance with the method given in Application Example E.

What is claimed is:

1. A compound of the formula

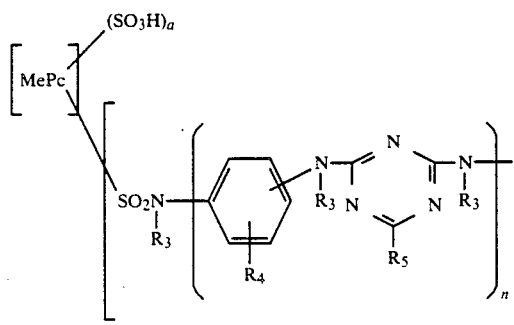

or a water-soluble salt thereof each cation of which is independently a non-chromophoric cation, wherein
Me is cobalt, copper or nickel,
Pc is the phthalocyanine nucleus,
each $R_4$ is independently hydrogen, halo, hydroxy, $C_{1-4}$alkoxy, $C_{1-4}$alkyl, carboxy or sulfo,
$R_6$ is hydrogen, cyano, carbamoyl or

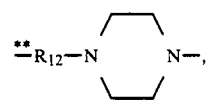

wherein
$An^\ominus$ is a non-chromophoric anion,
$R_7$ is hydrogen, $C_{1-4}$alkyl, $C_{5-6}$cycloalkyl, phenyl, benzyl, phenylethyl or carboxy,
W is linear or branched $C_{2-6}$alkylene; linear or branched $C_{3-6}$alkylene monosubstituted by hydroxy; linear or branched $C_{2-6}$alkylene interrupted by

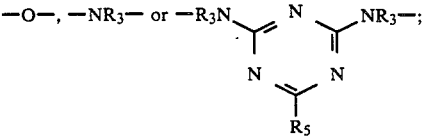

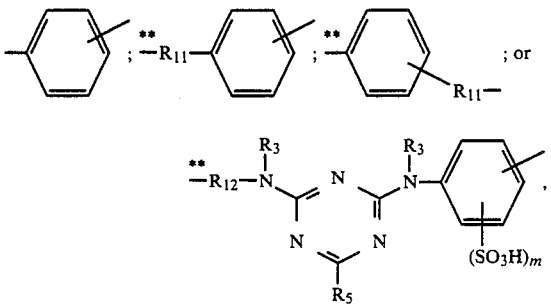

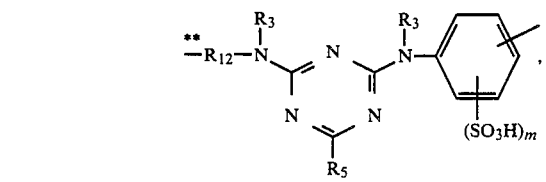

wherein
$R_{11}$ is linear or branched $C_{1-4}$alkylene,
m is 0 or 1, and
the ** denotes the bond attached to the nitrogen atom of the pyridone ring, or —W—NR$_3$— is

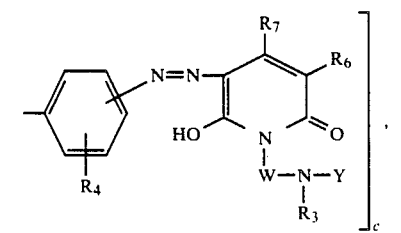

wherein the ** is as defined above,
Y is a fiber-reactive group,
a is 1, 2 or 3,
c is 1 or 2, with the provisos that the sum of a and c does not exceed 4 and that each of the four units of the phthalocyanine nucleus contains a maximum of one substituent selected from those to which a and c relate, and
n is 0 or 1, wherein
each $R_3$ is independently hydrogen, $C_{1-4}$alkyl or $C_{2-4}$hydroxyalkyl,
each $R_5$ is independently halo, amino or an aliphatic, cycloaliphatic, aromatic or heterocyclic amino group, and
each $R_{12}$ is independently linear or branched $C_{2-4}$alkylene,
or a mixture of such compounds or salts.

2. A compound according to claim 1, or a water-soluble salt thereof each cation of which is independently a non-chromophoric cation.

3. A compound according to claim 1, or a water-soluble salt thereof each cation of which is independently a non-chromophoric cation, wherein
a is 2 or 3, and
c is 1,
or a mixture of such compounds or salts.

4. A compound according to claim 1, or a water-soluble salt thereof each cation of which is independently a non-chromophoric cation, wherein
each $R_5$ is independently fluoro, chloro, bromo or —N($R_{13}$)$_2$,
wherein each $R_{13}$ is independently hydrogen; $C_{1-4}$alkyl; $C_{1-4}$alkyl substituted by 1 or 2 substituents selected from hydroxy, $C_{1-4}$alkoxy, carboxy, sulfo, amino, $C_{1-4}$alkylamino, N,N-di-($C_{1-4}$alkyl)amino, phenyl or phenyl substituted by 1 to 3 substituents selected from halo, $C_{1-4}$alkyl, $C_{1-4}$-alkoxy, carboxy and sulfo; phenyl; phenyl substituted by 1 to 3 substituents selected from halo, $C_{1-4}$alkyl, $C_{1-4}$alkoxy, carboxy and sulfo; $C_{5-6}$cycloalkyl; or cycloalkyl substituted by 1 to 3 $C_{1-4}$alkyl groups, or —$N(R_{13})_2$ is a saturated or partially saturated 5- or 6-membered heterocyclic ring containing a nitrogen atom and 0, 1 or 2 additional hetero atoms selected from nitrogen, oxygen and sulfur, which ring is unsubstituted or substituted by 1 to 3 $C_{1-4}$alkyl groups, or a mixture of such compounds or salts.

5. A compound according to claim 4, or a water-soluble salt thereof each cation of which is independently a non-chromophoric cation, wherein W is linear or branched $C_{2-6}$alkylene, linear or branched $C_{3-6}$alkylene monosubstituted by hydroxy, —$(CH_2)_q$—$NR_{3b}$—$(CH_2)_q$—,

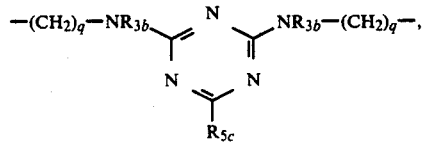

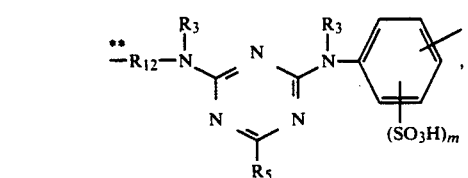

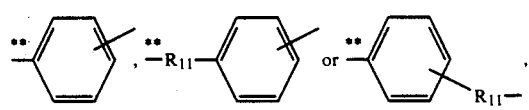

wherein each $R_{3b}$ is independently hydrogen or methyl, $R_{5c}$ is chloro or —$NR_{8b}R_{9b}$, wherein $R_{8b}$ and $R_{9b}$ are independently hydrogen, $C_{2-3}$hydroxyalkyl or phenyl monosubstituted by methyl or sulfo, and each q is independently 2 or 3, or a mixture of such compounds or salts.

6. A compound according to claim 5, or a water-soluble salt thereof each cation of which is independently a non-chromophoric cation, wherein a is 2 or 3, and c is 1, or a mixture of such compounds or salts.

7. A compound according to claim 5, or a water-soluble salt thereof each cation of which is independently a non-chromophoric cation, wherein Y is

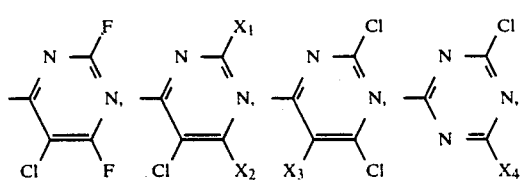

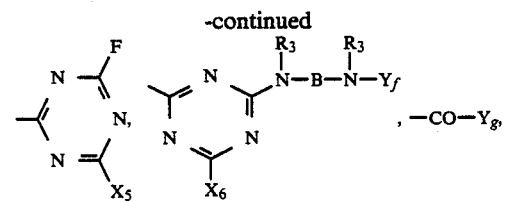

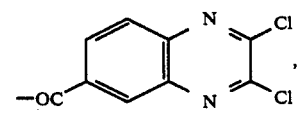

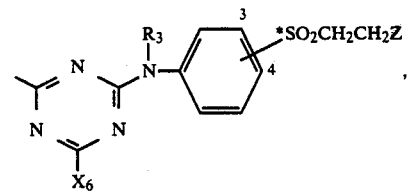

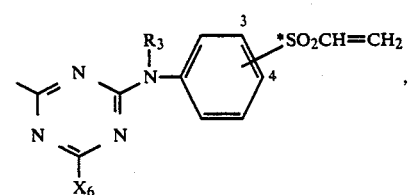

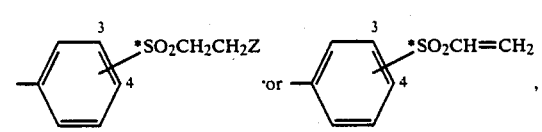

wherein B is linear or branched $C_{2-4}$alkylene, linear or branched $C_{3-4}$alkylene monosubstituted by hydroxy,

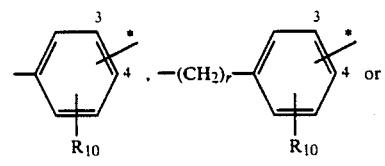

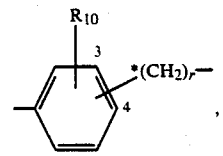

wherein $R_{10}$ is hydrogen, chloro, methyl, methoxy, sulfo or carboxy, and r is 1, 2 or 3, or

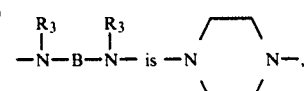

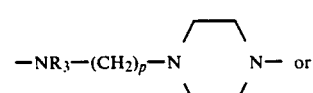

-continued

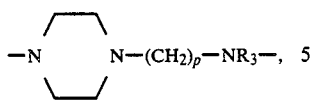

wherein
p is 2, 3 or 4,
$X_1$ is fluoro or $C_{1-4}$alkylsulfonyl,
$X_2$ is $C_{1-4}$alkyl or $C_{1-4}$haloalkyl,
$X_3$ is hydrogen or chloro,
$X_4$ is chloro; hydroxy; $C_{1-4}$alkoxy; phenoxy; phenoxy substituted by 1 or 2 substituents selected from halo, $C_{1-4}$alkyl, $C_{1-4}$alkoxy and sulfo; or —$NR_8R_9$,
$X_5$ is —$NR_8R_9$,
$X_6$ is fluoro, chloro or —$NR_8R_9$,
$Y_f$ is

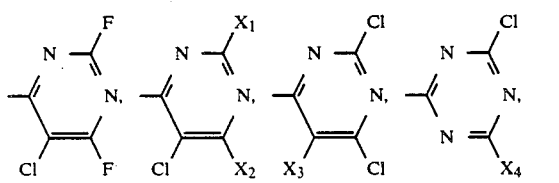

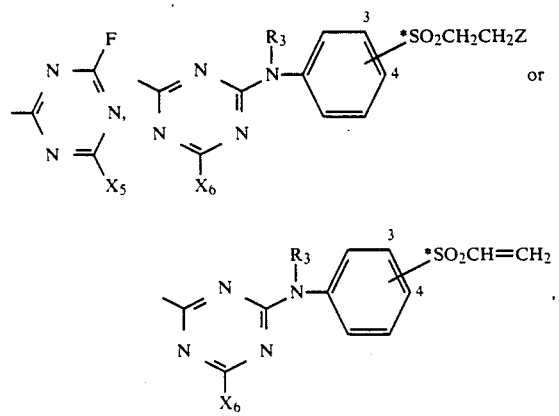

wherein
$X_1$–$X_6$ are as defined above, and
$Y_g$ is vinyl, chloromethyl,

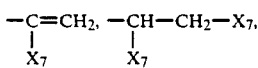

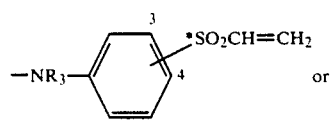

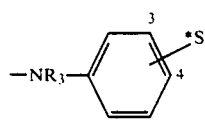

wherein each $X_7$ is independently chloro or bromo,
wherein
each $R_3$ is independently hydrogen, $C_{1-4}$alkyl or $C_{2-4}$hydroxyalkyl, each $R_8$ and $R_9$ is independently hydrogen; $C_{1-4}$alkyl; $C_{1-4}$alkyl monosubstituted by hydroxy, $C_{1-4}$alkoxy, carboxy, sulfo, amino, $C_{1-4}$alkylamino or N,N-di-($C_{1-4}$alkyl)amino; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, sulfo and carboxy; phenyl($C_{1-4}$alkyl) or phenyl($C_{1-4}$alkyl) the phenyl ring of which is substituted by 1 or 2 substituents selected from halo, $C_{1-4}$alkyl, $C_{1-4}$alkoxy, sulfo and carboxy; or —$NR_8R_9$ is piperidino; morpholino; piperazino; or piperidino, morpholino or piperazino substituted by 1 to 3 methyl groups, Z is chloro, —O—$SO_3H$, —S—$SO_3H$ or ($C_{1-4}$alkyl)-carbonyloxy, and each * denotes a bond attached to the 3-position or the 4-position of the ring to which it is attached, or a mixture of such compounds or salts.

8. A compound according to claim 7, or a water-soluble salt thereof each cation of which is independently a non-chromophoric cation, wherein
a is 2 or 3, and
c is 1,
or a mixture of such compounds or salts.

9. A compound according to claim 1, or a water-soluble salt thereof each cation of which is independently a non-chromophoric cation, wherein Me is copper or nickel, or a mixture of such compounds or salts.

10. A compound according to claim 9, or a water-soluble salt thereof each cation of which is independently a non-chromophoric cation, wherein each $R_4$ is independently hydrogen or sulfo, or a mixture of such compounds or salts.

11. A compound according to claim 9, or a water-soluble salt thereof each cation of which is independently a non-chromophoric cation,
wherein each $R_5$ is independently fluoro, chloro or —$NR_8R_9$,
wherein
each $R_8$ and $R_9$ is independently hydrogen; $C_{1-4}$alkyl; $C_{1-4}$alkyl monosubstituted by hydroxy, $C_{1-4}$alkoxy, carboxy, sulfo, amino, $C_{1-4}$alkylamino or N,N-di-($C_{1-4}$alkyl)amino; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, sulfo and carboxy; phenyl($C_{1-4}$-alkyl) or phenyl($C_{1-4}$alkyl) the phenyl ring of which is substituted by 1 or 2 substituents selected from halo, $C_{1-4}$alkyl, $C_{1-4}$alkoxy, sulfo and carboxy; or —$NR_8R_9$ is piperidino; morpholino; piperazino; or piperidino, morpholino or piperazino substituted by 1 to 3 methyl groups, or a mixture of such compounds or salts.

12. A compound according to claim 9, or a water-soluble salt thereof each cation of which is independently a non-chromophoric cation, wherein $R_6$ is hydrogen or carbamoyl, or a mixture of such compounds or salts.

13. A compound according to claim 12, or a water-soluble salt thereof each cation of which is independently a non-chromophoric cation, wherein $R_7$ is methyl, ethyl, benzyl or cyclohexyl, or a mixture of such compounds or salts.

14. A compound according to claim 1 having the formula

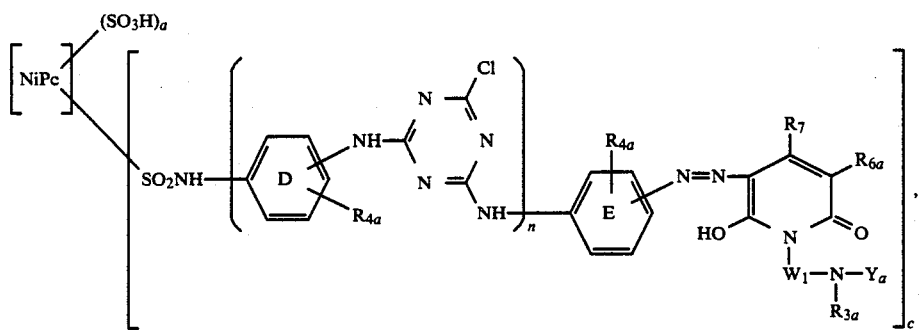

or a water-soluble salt thereof each cation of which is independently a non-chromophoric cation,
wherein
Pc is the phthalocyanine nucleus,
$R_{3a}$ is hydrogen, methyl, ethyl or 2-hydroxyethyl,
each $R_{4a}$ is independently hydrogen, chloro, $C_{1-2}$alkyl, $C_{1-2}$alkoxy, carboxy or sulfo,
$R_{6a}$ is hydrogen, carbamoyl or

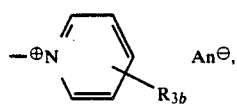

wherein $An^{\ominus}$ is a non-chromophoric anion,
$R_7$ is hydrogen, $C_{1-4}$alkyl, $C_{5-6}$cycloalkyl, phenyl, benzyl, phenylethyl or carboxy,
$W_1$ is $-(CH_2)_p-$, $-(CH_2)_q-NR_{3b}-(CH_2)_q-$,

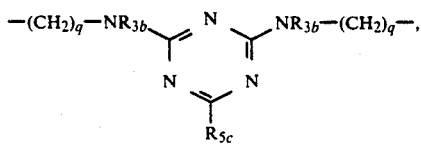

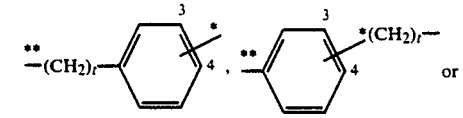

wherein $R_{5c}$ is chloro or $-NR_{8b}R_{9b}$,
wherein each of $R_{8b}$ and $R_{9b}$ is independently hydrogen, $C_{2-3}$hydroxyalkyl or phenyl monosubstituted by methyl or sulfo,
m is 0 or 1,
t is 1 or 2, and
the ** denotes the bond attached to the nitrogen atom of the pyridone ring, or

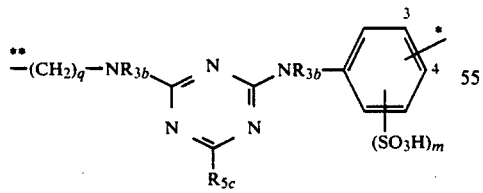

wherein the ** is as defined above,

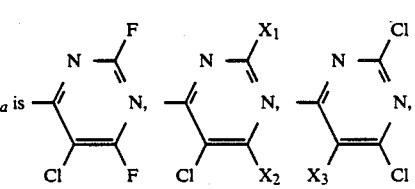

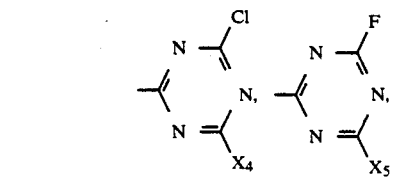

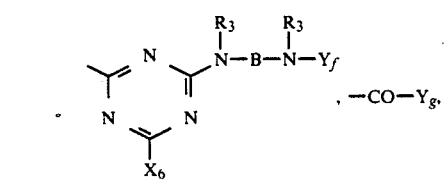

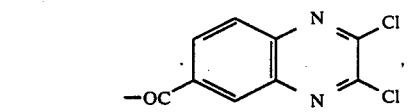

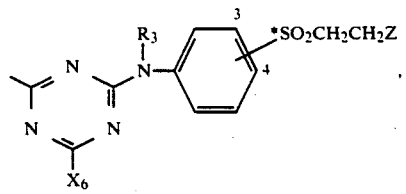

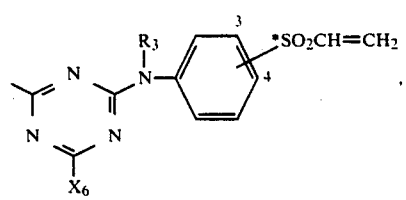

-continued

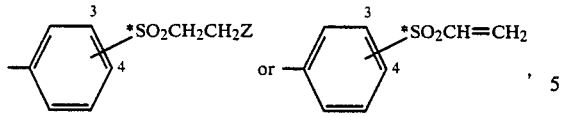

wherein
B is an aliphatic, cycloaliphatic, aromatic or aromatic-aliphatic bridging radical, or

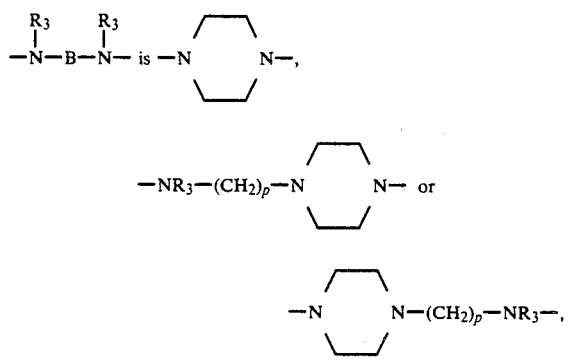

$X_1$ is fluoro or $C_{1-4}$alkylsulfonyl,
$X_2$ is $C_{1-4}$alkyl or $C_{1-4}$haloalkyl,
$X_3$ is hydrogen or chloro,
$X_4$ is chloro; hydroxy; $C_{1-4}$alkoxy; phenoxy; phenoxy substituted by 1 or 2 substituents selected from halo, $C_{1-4}$alkyl, $C_{1-4}$alkoxy and sulfo; or $-NR_8R_9$,
$X_5$ is $-NR_8R_9$,
$X_6$ is fluoro, chloro or $-NR_8R_9$,
$Y_f$ is

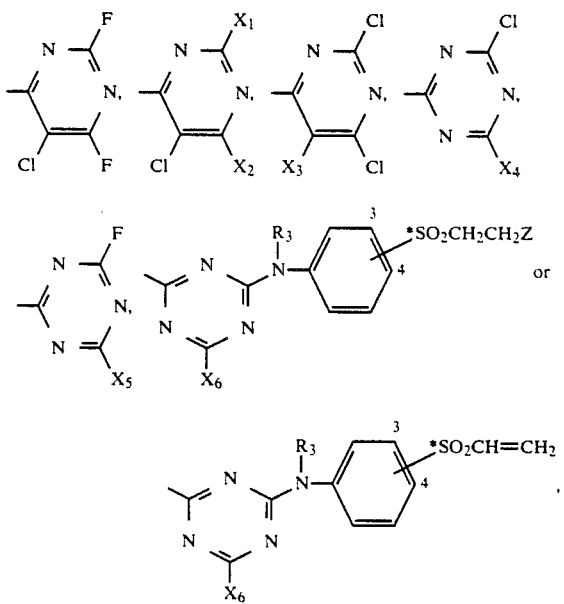

wherein
$X_1$-$X_6$ are as defined above, and
$Y_g$ is vinyl, chloromethyl, $$-C=CH_2, -CH-CH_2-X_7,$$
$$\phantom{-C=}X_7 \phantom{-CH-}X_7$$

-continued

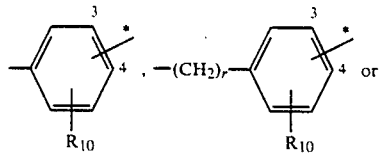

wherein
each $X_7$ is independently chloro or bromo,
a is 1, 2 or 3,
c is 1 or 2, with the provisos that the sum of a and c does not exceed 4 and that each of the four units of the phthalocyanine nucleus contains a maximum of one substituent selected from those to which a and c relate, and
n is 0 or 1,
wherein
each $R_3$ is independently hydrogen, $C_{1-4}$alkyl or $C_{2-4}$hydroxyalkyl,
each $R_{3b}$ is independently hydrogen or methyl,
each $R_8$ and $R_9$ is independently hydrogen; $C_{1-4}$alkyl; $C_{1-4}$alkyl monosubstituted by hydroxy, $C_{1-4}$alkoxy, carboxy, sulfo, amino, $C_{1-4}$alkylamino or N,N-di-($C_{1-4}$alkyl)amino; cyclohexyl; cyclohexyl substituted by 1 to 3 methyl groups; phenyl; phenyl substituted by 1 or 2 substituents selected from halo, $C_{1-4}$alkyl, $C_{1-4}$alkoxy, sulfo and carboxy; phenyl($C_{1-4}$alkyl) or phenyl($C_{1-4}$alkyl) the phenyl ring of which is substituted by 1 or 2 substituents selected from halo, $C_{1-4}$alkyl, $C_{1-4}$alkoxy, sulfo and carboxy; or
$-NR_8R_9$ is piperidino; morpholino; piperazino; or piperidino, morpholino or piperazino substituted by 1 to 3 methyl groups, Z is a group capable of being split off,
each p is independently 2, 3 or 4,
each q is independently 2 or 3, and
each * independently denotes a bond attached to the 3-position or the 4-position of the ring to which it is attached,
or a mixture of such compounds or salts.

15. A compound according to claim 14, or a water-soluble salt thereof each cation of which is independently a non-chromophoric cation,
wherein B is linear or branched $C_{2-4}$alkylene, linear or branched $C_{3-4}$alkylene monosubstituted by hydroxy,

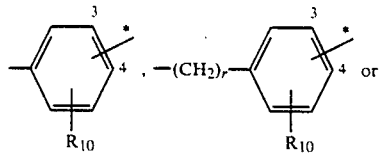

wherein

R₁₀ is hydrogen, chloro, methyl, methoxy, sulfo or carboxy, and
r is 1, 2 or 3, or

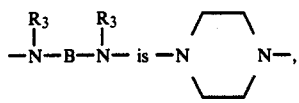

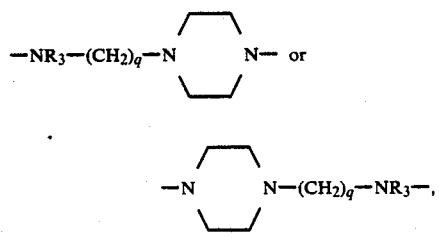

Z is chloro, —O—SO₃H, —S—SO₃H or (C₁₋₄alkyl)-carbonyloxy,
a is 2 or 3, and
c is 1, or a mixture of such compounds or salts.

16. A compound according to claim 15, or a water-soluble salt thereof each cation of which is independently a non-chromophoric cation, wherein
   (i) each $R_{4a}$ is independently hydrogen, methyl or sulfo,
   (ii) $R_{6a}$ is hydrogen or carbamoyl,
   (iii) $R_7$ is methyl, ethyl, benzyl or cyclohexyl,
   (iv) (i) and either (ii) or (iii),
   (v) (ii) and (iii), or
   (vi) (i), (ii) and (iii),
or a mixture of such compounds or salts.

17. A compound according to claim 16 having the formula

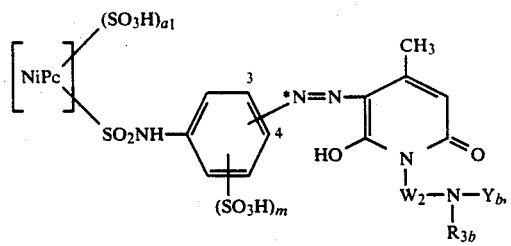

or a water-soluble salt thereof each cation of which is independently a non-chromophoric cation,
   wherein Pc is the phthalocyanine nucleus, $W_2$ is —(CH₂)$_q$— or

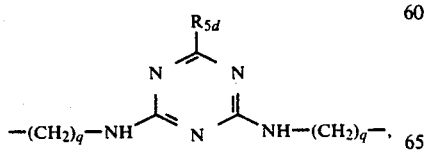

wherein $R_{5d}$ is chloro, amino or 2-hydroxyethylamino, or

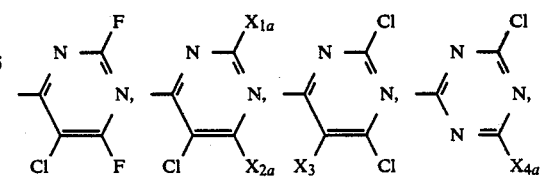

wherein
the ** denotes the bond attached to the nitrogen atom of the pyridone ring,
$Y_b$ is

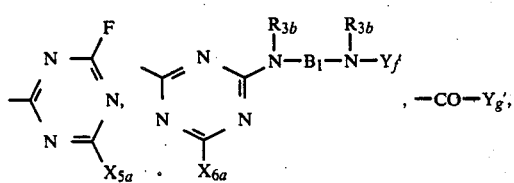

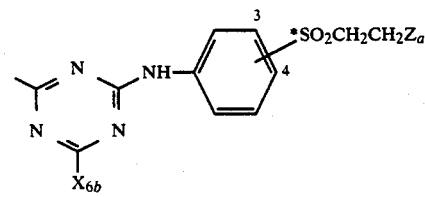

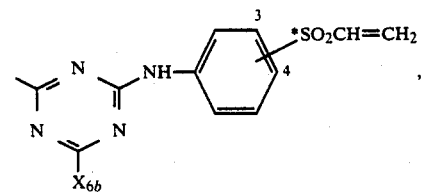

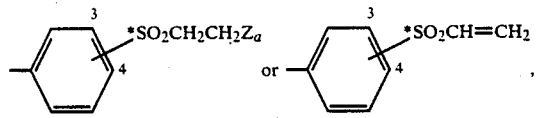

wherein B₁ is linear or branched C₂₋₄alkylene, linear or branched C₃₋₄alkylene monosubstituted by hydroxy,

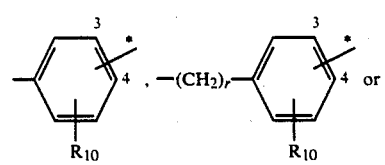

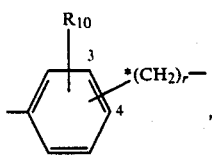

wherein $R_{10}$ is hydrogen, chloro, methyl, methoxy, sulfo or carboxy, and r is 1, 2 or 3, or

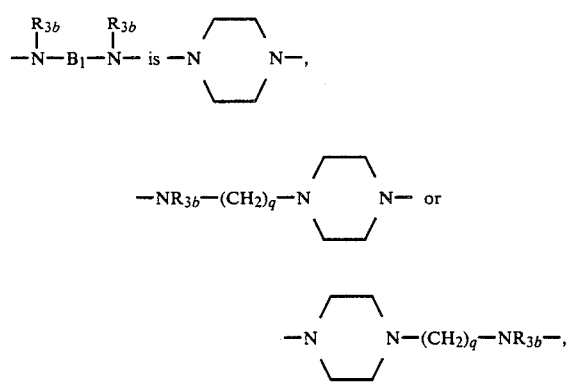

$X_{1a}$ is fluoro or methylsulfonyl,
$X_{2a}$ is methyl or chloromethyl,
$X_3$ is hydrogen or chloro,
$X_{4a}$ is chloro, hydroxy, methoxy or $-NR_{8a}R_{9a}$,
$X_{5a}$ is $-NR_{8a}R_{9a}$,
$X_{6a}$ is fluoro, chloro or $-NR_{8a}R_{9a}$,
$X_{6b}$ is chloro or $-NR_{8b}R_{9b}$,
wherein each of $R_{8b}$ and $R_{9b}$ is independently hydrogen, $C_{2-3}$hydroxyalkyl or phenyl monosubstituted by methyl or sulfo,

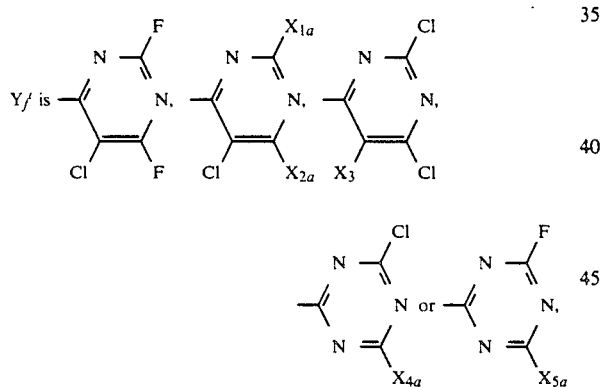

wherein
$X_{1a}$, $X_{2a}$, $X_3$, $X_{4a}$ and $X_{5a}$ are as defined above, and $Y_g'$ is vinyl, chloromethyl, 1-bromovinyl, 1,2-dibromoethyl,

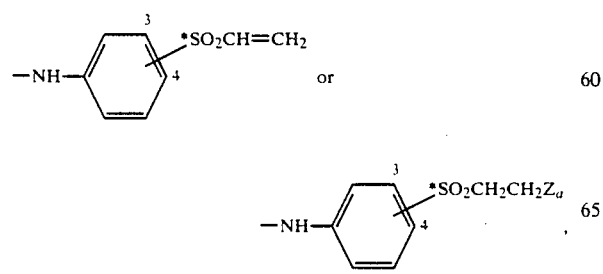

$a_1$ is 2 or 3, with the proviso that each of the four units of the phthalocyanine nucleus contains a maximum of one substituent selected from sulfo and

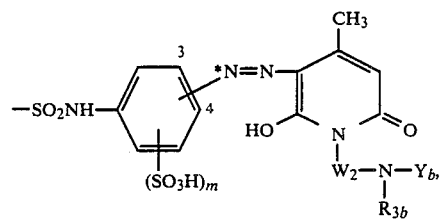

m is 0 or 1, and
wherein
each $R_{3b}$ is independently hydrogen or methyl,
each $R_{8a}$ and $R_{9a}$ is independently hydrogen; $C_{1-2}$alkyl; $C_{1-3}$alkyl monosubstituted by hydroxy, carboxy or sulfo; phenyl; phenyl substituted by 1 or 2 substituents selected from chloro, methyl, methoxy, sulfo and carboxy; phenyl($C_{1-2}$alkyl) or phenyl($C_{1-2}$alkyl) the phenyl group of which is substituted by 1 or 2 substituents selected from chloro, methyl, methoxy, sulfo and carboxy, or
$-NR_{8a}R_{9a}$ is piperidino, morpholino, piperazino or N-methylpiperazino,
each $Z_a$ is independently chloro, $-O-SO_3H$, $-S-SO_3H$ or ($C_{1-4}$alkyl)carbonyloxy,
each q is independently 2 or 3, and
each * independently denotes a bond attached to the 3-position or the 4-position of the ring to which it is attached,
or a mixture of such compounds or salts.

18. A compound according to claim 17, or a water-soluble salt thereof each cation of which is independently a non-chromophoric cation.

19. A compound according to claim 17, or a water-soluble salt thereof each cation of which is independently a non-chromophoric cation, wherein $W_2$ is $-(CH_2)_q-$,
wherein q is 2 or 3, and

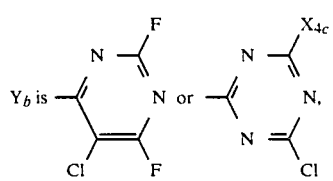

wherein $X_{4c}$ is chloro, amino or 2-hydroxyethylamino,

20. A mixture of salts according to claim 19 having the formula

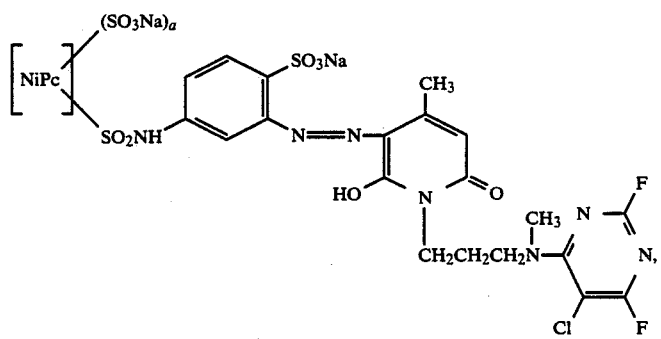

wherein a is 2 or 3, and its average value is about 2.5, with the proviso that each of the four units of the phthalocyanine nucleus contains a maximum of one substituent selected from —SO₃Na and

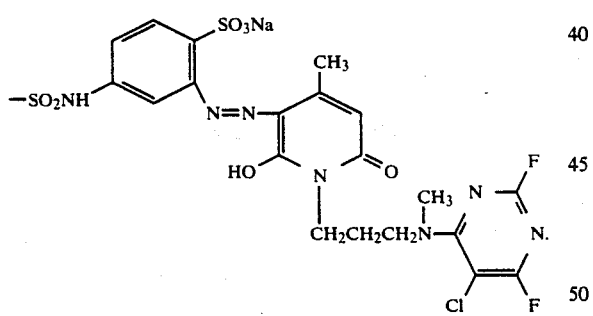

21. A mixture of salts according to claim 19 having the formula

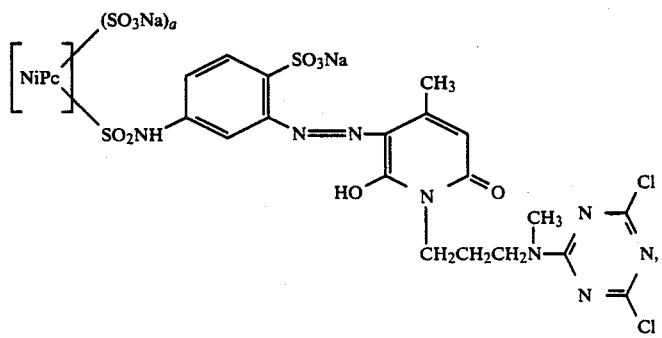

wherein a is 2 or 3, and its average value is about 2.5, with the proviso that each of the four units of the phthalocyanine nucleus contains a maximum of one substituent selected from —SO₃Na and

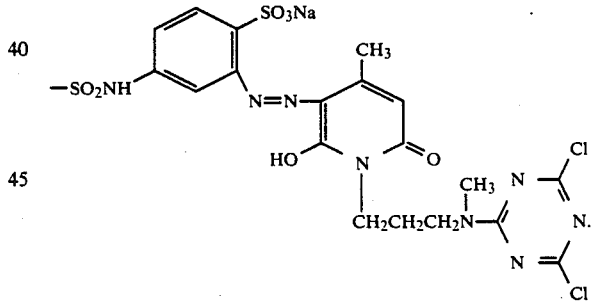

* * * * *